June 23, 1970  K. HEYMAN  3,516,111
UNIVERSAL BUSHING

Filed Dec. 22, 1967  2 Sheets-Sheet 1

INVENTOR
KERRY HEYMAN

BY Auslander + Thomas

ATTORNEYS

June 23, 1970  K. HEYMAN  3,516,111

UNIVERSAL BUSHING

Filed Dec. 22, 1967  2 Sheets-Sheet 2

INVENTOR
KERRY HEYMAN

BY Auslander & Thomas

ATTORNEYS

United States Patent Office 3,516,111
Patented June 23, 1970

---

3,516,111
UNIVERSAL BUSHING
Kerry Heyman, Summit, N.J., assignor to Heyman Manufacturing Company, Kenilworth, N.J., a corporation of New Jersey
Filed Dec. 22, 1967, Ser. No. 692,854
Int. Cl. F16l 5/00
U.S. Cl. 16—2                                                1 Claim

ABSTRACT OF THE DISCLOSURE

A new self-locking bushing adapted to be fitted into an aperture in a panel, the bushing having an opening therethrough and a plurality of supports radiating about an epicenter in the bushing opening with the supports substantially covering the area of the opening in the bushing, the supports adapted to yield in resilient engagement with an element extending through the bushing opening.

---

The present invention relates to a new self-locking bushing adapted to be fitted into an aperture in a panel.

In the past many bushings have been provided that are adapted to be snapped into panel apertures. Such bushings have usually served to protect wires or tubes passing through such apertures against wear or shock or both.

Oftentimes the diameter of the wire or tube desired to pass through an aperture may be variable or it may be undesirable to maintain a stock of varying diameter bushings since it is expensive to have to spend the labor time to select the proper diameter bushing from inventory and to maintain inventory stock on all diameters required.

In many instances delicate wires or tubes may be desired to be protected by bushings and it may be undesirable to maintain inventories of special bushings for electrical conductor wires and another for non-electric elements passing through an aperture in a panel yet requiring the protection of a bushing.

In the past variable sized opening grommets or bushings have been used which have been adaptable to some dimensional variation of the element passing through the bushing. Such bushings have included metal fingers which have been spreadable to grasp an element such as a tube or a wire, the fingers usually being permanently distorted once the bushing has been used.

According to the present invention a self locking bushing is provided which is self-lockable into a panel aperture and adapted to support varying diameter of elements with a minimum of surface abrasion of the element passing through the bushing.

Such bushing is preferably made of plastic and preferably of a dielectric material so that it may serve both as an electrical insulator where desired yet be available for non-electric uses. By its novel configuration the bushing of the present invention may also serve to some extent as an insulator against physical shock whether or not it is an electrical conductor or non-electrical element held by the bushing. The bushing may further receive and hold elements passing through it at an angle or even tend to center align shafts.

Although such novel feature or features believed to be characteristic of the invention are pointed out in the claim, the invention and the manner in which it may be carried out may be further understood by reference to the description following and the accompanying drawings.

Referring now to the figures in greater detail, where like reference numbers denote like parts in the various figures.

Figure 1:
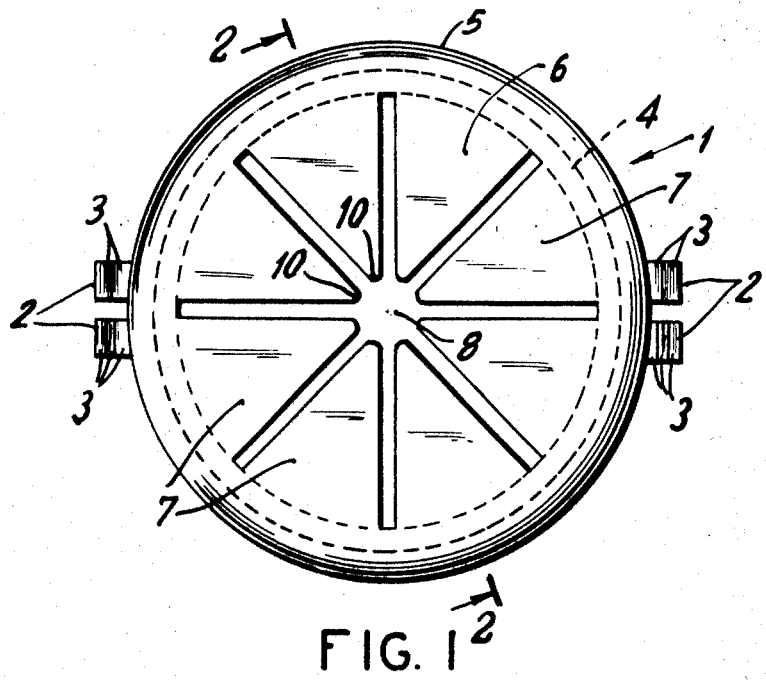
FIG. 1 is a plan view of a self locking bushing of the present invention.
Figure 2:
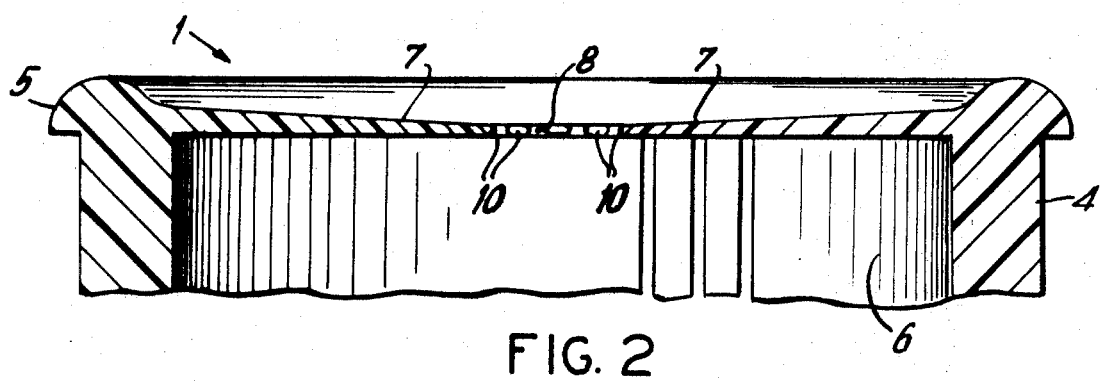
FIG. 2 is a partial section of FIG. 1 at lines 2—2.

The bushing 1 as shown in FIGS. 1 and 2 is a round configuration with fingers 2 such as disclosed in U.S. Pat. No. 2,424,757 including shoulders 3 adapted to lock the bushing 1 in a selection of apertures in panels or walls of various thicknesses. The fingers 2 extend from the peripheral wall 4 of the bushing 1.

The bushing 1 has an outer periphery 5 of a greater dimension than the peripheral wall 4. The outer periphery 5 and inner wall act as a flange to hold the bushing 1 in an aperture when the shoulders 3 or the fingers 2 engage the inner wall of a panel.

The bushing 1 includes an inner opening 6 through which an element such as a tube, shaft or wire may enter through. The opening 6 as illustrated in the figures is covered by flexible supports 7.

Figure 3:
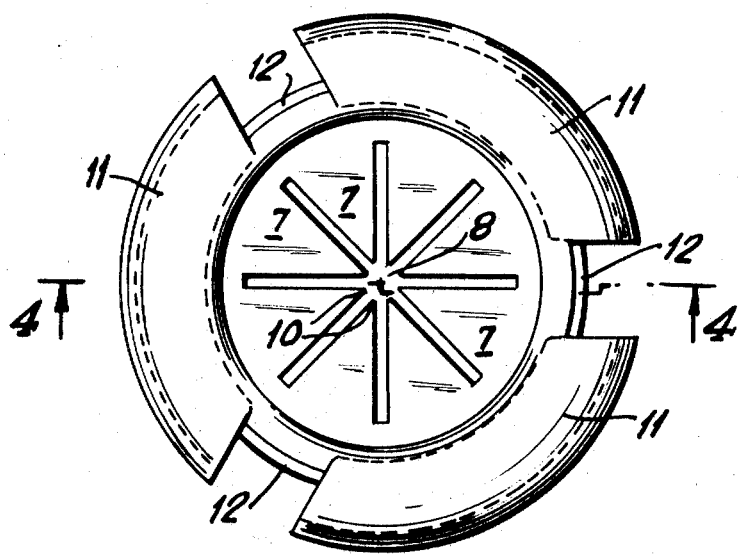
FIG. 3 is a plan view of another embodiment of the bushing of the present invention.
Figure 7:
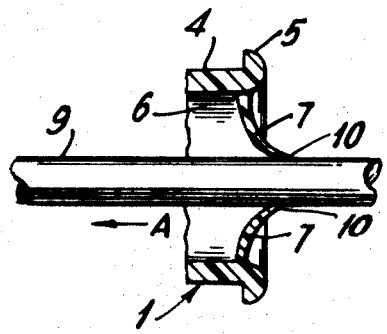
FIG. 7 is a section view of a bushing of the present invention with an element extended through from one direction.
Figure 8:
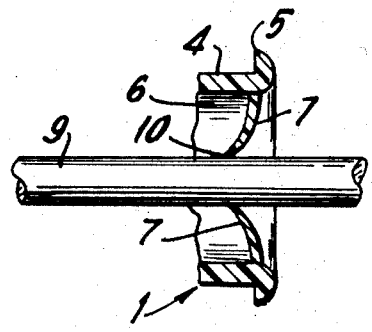
FIG. 8 is a section view of a bushing of the present invention with an element extended through from another direction.

The supports 7 radiate about an epicenter 8 and are flexible and resilient, either yieldable outward or inward as shown in FIGS. 7 and 8 towards the inner opening. Thus, an element 9 held by the supports 7 tends to be uniformly supported and centered about the epicenter 8 generally held towards the central axis of the inner opening 6. The supports 7 are generally of a hard, but flexible dielectric plastic. As such, they tend not to scratch sensitive surfaces which may be present on an element inserted into the bushing and tend to hold such element 9 against counter movement from the direction of insertion without precluding counter movement. It is preferable that the supports 7 radiate from within the opening 6 transversely to the central axis of the opening 6. As shown in FIG. 3, for example, the supports 7 may radiate from a plane substantially parallel to one end of the bushing.

As can be seen in FIG. 7, movement of the element 9 in the direction of the arrow A would tend to impress the supports 7 on the element 9 and grasp. The flexible quality of the supports 7 protect against abrasion and further tend to naturally center an element 9, even one of an irregular configuration.

Support is still effective where an element 9 passes through the bushing 1 at an angle. The supports in uniform radiation from the epicenter also tend to insulate an element 9 against physical shock in all directions.

As illustrated, the supports 7 are spaced apart segments having pointed ends 10 directed towards the epicenter 8. The supports preferably taper to a narrow thickness towards their pointed ends 10. The points 10 are preferably rounded off.

The embodiments of the present invention as shown in FIGS. 3–6 are set forth illustrating a selection of panel locking means to snap in the bushing 1 of the present invention.

Figure 4:
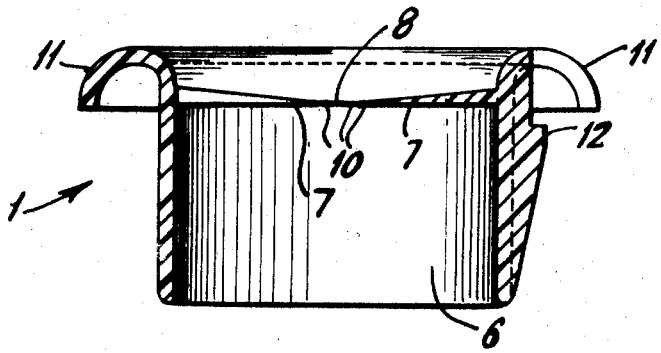
FIG. 4 is a section of FIG. 3 at lines 4—4.

In FIG. 3 and FIG. 4 the panel lock is effected between the flange 11 and the rib 12.

Figure 5:
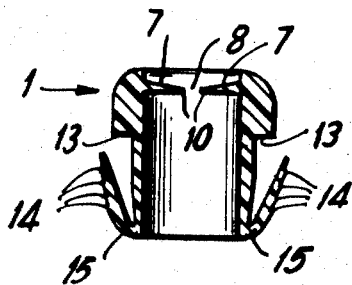
FIG. 5 is a section of another embodiment of the present invention.

In FIG. 5 the panel lock is effected between the flange 13 and the shoulders 14 on the arms 15.

Figure 6:
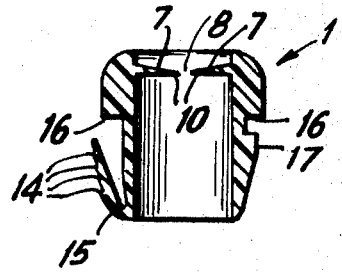
FIG. 6 is a section of another embodiment of the present invention.

In FIG. 6 the panel lock is effected by a combination of locking between the flange 16 and the rib 17 and arm 15 and shoulders 14 with the flange 16.

The terms and expressions which are employed are used as terms of description; it is recognized, though, that various modifications are possible.

Having thus described certain forms of the invention in some detail, what is claimed is:

1. In combination with a self-locking bushing adapted to be snap locked in an aperture in a supporting panel and having an axial opening therethrough, a plurality of flexible generally pie-shaped supports, each said support substantially radiating about an epicenter in said bushing, said supports being integral to and extending from a peripheral end portion of said bushing, said supports substantially covering the area of said opening in said bushing and being spaced from each other by radially extending slots, said supports being substantially transverse to the central axis of said opening and tapered to a narrower thickness toward said epicenter, and said supports lying in a plane above the plane of the apertured panel adapted to accept the emplacement of an element therebetween to yield in the direction of emplacement of said element positioned through said opening for resilient engagement with said element.

References Cited

UNITED STATES PATENTS

| | | |
|---|---|---|
| 561,441 | 6/1896 | Schmidt. |
| 1,697,814 | 1/1929 | Forbes. |
| 1,817,776 | 8/1931 | Sipe. |
| 3,365,761 | 1/1968 | Kalvig. |
| 2,424,757 | 7/1947 | Klumpp. |
| 2,898,798 | 8/1959 | Carno _____ 85—84 |
| 3,001,007 | 9/1961 | Klumpp et al. _____ 16—2 XR |
| 3,144,695 | 8/1964 | Budwig _____ 85—84 XR |
| 3,351,974 | 11/1967 | Wilhelmi _____ 16—2 |

FOREIGN PATENTS

| | | |
|---|---|---|
| 551,362 | 11/1956 | Italy. |

DONALD A. GRIFFIN, Primary Examiner

U.S. Cl. X.R.

248—314